US007050869B1

(12) United States Patent
Katayama et al.

(10) Patent No.: US 7,050,869 B1
(45) Date of Patent: May 23, 2006

(54) AUDIO SYSTEM CONDUCTING DIGITAL SIGNAL PROCESSING, A CONTROL METHOD THEREOF, A RECORDING MEDIA ON WHICH THE CONTROL METHOD IS RECORDED

(75) Inventors: Masaki Katayama, Hamamatsu (JP); Yasuhiro Fujimura, Hamamatsu (JP); Tetsuya Matsuyama, Hamamatsu (JP)

(73) Assignee: Yamaha Corporation (JP)

( * ) Notice: Subject to any disclaimer, the term of this patent is extended or adjusted under 35 U.S.C. 154(b) by 693 days.

(21) Appl. No.: 09/593,866

(22) Filed: Jun. 14, 2000

(30) Foreign Application Priority Data

Jun. 15, 1999 (JP) ............................. 11-169000

(51) Int. Cl.
*G06F 17/00* (2006.01)
(52) U.S. Cl. .................... 700/94; 381/61; 381/119; 84/600
(58) Field of Classification Search ............... 381/61, 381/63, 124, 310, 101, 102, 104, 107, 109, 381/119; 40/455, 906; 84/600, 653; 700/94
See application file for complete search history.

(56) References Cited

U.S. PATENT DOCUMENTS

| | | | | |
|---|---|---|---|---|
| 5,208,860 A | * | 5/1993 | Lowe et al. | 381/17 |
| 5,734,731 A | * | 3/1998 | Marx | 381/119 |
| 5,812,688 A | * | 9/1998 | Gibson | 381/119 |
| 5,999,630 A | * | 12/1999 | Iwamatsu | 381/17 |
| 6,026,169 A | * | 2/2000 | Fujimori | 381/61 |
| 6,154,549 A | * | 11/2000 | Arnold et al. | 381/104 |
| 6,459,797 B1 | * | 10/2002 | Ashour et al. | 381/18 |
| 6,490,359 B1 | * | 12/2002 | Gibson | 381/119 |
| 6,525,255 B1 | * | 2/2003 | Funaki | 84/616 |

FOREIGN PATENT DOCUMENTS

| | | |
|---|---|---|
| EP | 0 571 638 | 12/1992 |
| JP | 57-162685 | 4/1981 |
| JP | 58-110815 | 7/1983 |
| JP | 5-165443 | 7/1993 |
| JP | 5-173516 | 7/1993 |
| JP | 7-129174 | 5/1995 |
| JP | 08-336200 | * 12/1996 |
| JP | 8-336200 | 12/1996 |
| JP | 9-097157 | 4/1997 |
| JP | 10-200350 | 7/1998 |

OTHER PUBLICATIONS

Japanese Office Action mailed Feb. 17, 2004.

* cited by examiner

*Primary Examiner*—Huyen Le
*Assistant Examiner*—Lun-See Lao
(74) *Attorney, Agent, or Firm*—Dickstein, Shapiro, Morin & Oshinsky, LLP.

(57) ABSTRACT

To change a value of a DSP parameter in a DSP setting screen, a user selects from parameter operators a parameter value to be changed. In an image picture displayed on the DSP setting screen, a size, a color, and the like corresponding to substance of the pertinent parameter are changed according to the value of the parameter. The user can visually perceive effect of the value of each DSP parameter on an acoustic effect and can easily change the value of each DSP parameter.

9 Claims, 13 Drawing Sheets

FIG.4a
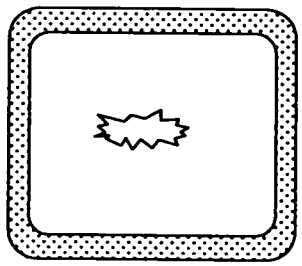
FIG.4a'
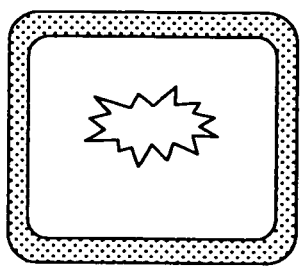
FIG.4a"
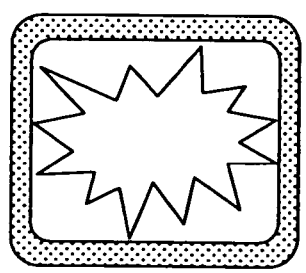
FIG.4b
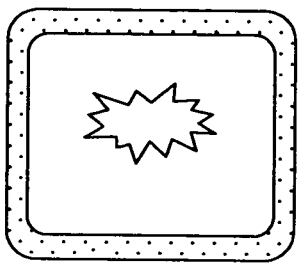
FIG.4b'
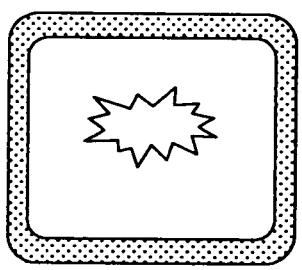
FIG.4b"
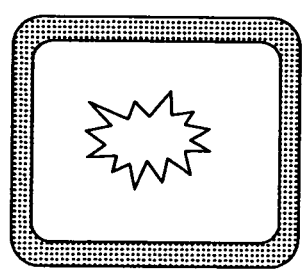
FIG.4c
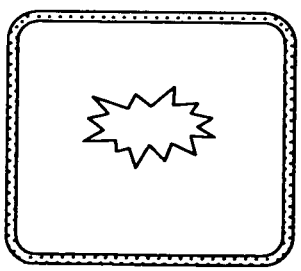
FIG.4c'
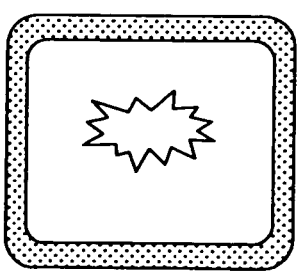
FIG.4c"
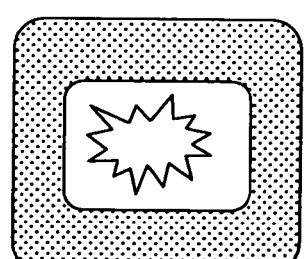

AUDIO SYSTEM CONDUCTING DIGITAL SIGNAL PROCESSING, A CONTROL METHOD THEREOF, A RECORDING MEDIA ON WHICH THE CONTROL METHOD IS RECORDED

This application is based on Japanese patent application Hei-11-169000 filed on Jun. 15, 1999, the entire contents of which are incorporated herein by reference.

BACKGROUND OF THE INVENTION a) Field of the Invention

The present invention relates to an audio system, a control method thereof, and a recording media on which a program of the method is recorded, and in particular, to an audio system capable of changing an acoustic effect or a sound effect using a graphical user interface (GUI) and a digital signal processor (DSP), a control method of the audio system, and a recording media on which a program of the method is recorded.

b) Description of the Related Art

FIG. 13 shows a block diagram an outline of an amplifier system as an example of a stand-alone audio system of the prior art.

An external compact disk (CD) player supplies a digital audio signal or an analog audio signal to a CD player terminal T1. An external tuner inputs an analog audio signal to a tuner terminal T2. Other audio signals are fed to a first auxiliary terminal T3 and a second auxiliary terminal T4. An input selector SL is connected to the terminals T1 to T4. The selector SL includes a digital-to-analog (D/A) converter and an analog-to-digital (A/D) converter, which are not shown. An analog audio signal is delivered via the selector SL to an audio amplifier section AM. The amplifier section AM conducts a digital signal processing (DSP) for the received signal, amplifies the resultant audio signal, and then outputs the amplified signal to a speaker terminal Ts. The terminal Ts is connected to a loudspeaker, not shown. A central processing unit (CPU) 150 controls the overall operation of the amplifier system AS. A read-only memory (ROM) 151 stores various programs for DSP, data for DSP, various control programs, and control data. A random access memory (RAM) 152 serves as a work area to temporarily store various data items. A display section 153 displays various information items such as a sound source being selected and a DSP mode. An operator panel 154 includes various types of operation keys.

A bus 155 connects the input selector SL, the CPU 150, the ROM 151, the RAM 152, the display 153, and the operator panel 154 to each other.

Operation of the amplifier system will be briefly described.

First, description will be given of a situation in which DSP is not conducted. When a user activates a selection switch, not shown, of the operator panel 154, an operation state of the panel 154 is notified via the bus 155 to the CPU 150. The input selector SL connects under control of the CPU 150 one of the terminals T1 to T4 to the audio amplifier section AM.

An external equipment inputs an analog audio signal or a digital audio signal via the selector SL to the amplifier section AM. The amplifier section AM amplifies the input signal and then outputs the amplified signal to the speaker terminal Ts. The speaker connected to the terminal Ts sounds.

Concurrently, the display section 153 displays information of the selected sound source (e.g., a CD player) or the like.

Next, description will be given of a situation to conduct DSP. When a user operates a selection switch and a DSP mode selection switch, not shown, of the panel 154, an operation state of the panel 154 is notified via the bus 155 to the CPU 150. Under control of the CPU 150, the input selector SL sequentially stores a digital signal obtained by converting an analog audio signal inputted from one of the terminals T1 to T4 or a digital audio signal therefrom in an RAM for DSP, not shown, in the audio amplifier section AM.

The CPU 150 operates as a digital signal processor. Specifically, the CPU 150 reads from the ROM 151 a program corresponding to the selected DSP mode ("HALL", "JAZZ", "ROCK", or "DISCO" mode) and conducts DSP for the digital audio signal stored in the DSP RAM. The amplifier section AM amplifies the analog audio signal resultant from the DSP and then outputs the amplified signal to the speaker terminal Ts. The speaker connected to the terminal Ts produces sound.

The display section 153 displays information of the selected sound source (e.g., a CD player), the selected DSP mode (e.g., "JAZZ"), and the like.

To obtain an acoustic effect corresponding to each DSP mode, a parameter value for each DSP mode is determined for the DSP parameter by the maker or manufacture of the system.

There has also been known an amplifier system having a function for the user to set various DSP parameters to be memorized therein.

However, the user must have technical knowledge to control DSP parameters in the amplifier system of the prior art. That is, a user not familiar with acoustics cannot recognize or perceive by senses what kind of effect is attained by controlling which one of the DSP parameters.

SUMMARY OF THE INVENTION

It is an object of the present invention to provide an audio system in which the user can visually recognize effect of each parameter value of DSP on the acoustic effect and can easily change the parameter value, a control method thereof, and a recording media on which the method is recorded.

According to one aspect of the present invention, there is provided an audio system, comprising: image display for displaying a plurality of types of parameters to determine acoustic characteristics and displaying image data beforehand set respectively to values of the parameters, corresponding to values of the parameters; and operator display for displaying, for each of the parameter types, a parameter operator to indicate a value of a parameter.

According to another aspect of the present invention, there is provided an audio system control method, comprising: an image display step of displaying a plurality of types of parameters to determine acoustic characteristics, values of the parameters, and image data beforehand set respectively to the values of the parameters, corresponding to the values of the parameters and an operator display step of displaying, for each of the parameter types, a parameter operator to indicate a value of a parameter.

According to another aspect of the present invention, there is provided a recording media for recording an audio system control program, wherein the program displays a plurality of types of parameters to determine acoustic characteristics, values of the parameters, and image data beforehand set respectively to the values of the parameters, corresponding to the values of the parameters and the program displays, for each of the parameter types, a parameter operator to indicate a value of a parameter.

As described above, there is provided an audio system in which the user can visually recognize the effect of DSP parameter values on the acoustic effect and can easily change the parameter values, a control method thereof, and a recording media on which the method is recorded.

BRIEF DESCRIPTION OF THE DRAWINGS

The objects and features of the present invention will become more apparent from the consideration of the following detailed description taken in conjunction with the accompanying drawings in which:

FIGS. 4a, 4a', 4a", 4b, 4b', 4b", 4c, 4c', and 4c" are diagrams showing examples of images displayed on a personal computer (PC) in the embodiment of the audio system;

DETAILED DESCRIPTION OF THE PREFERRED EMBODIMENTS

Figure 1:
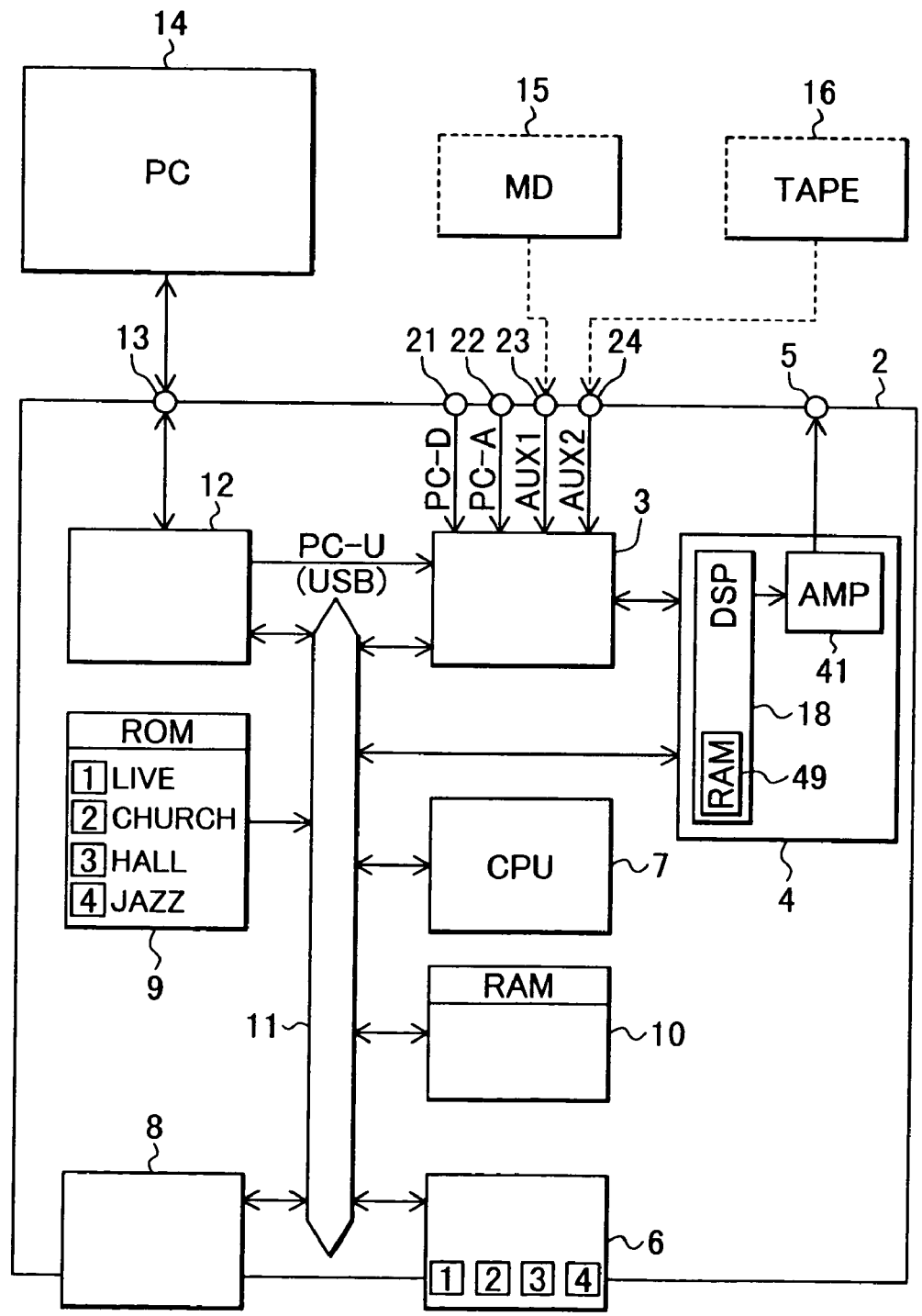
FIG. 1 is a block diagram showing constitution of an embodiment of an audio system according to the present invention.

FIG. 1 shows in a general block diagram of an embodiment of an audio system according to the present invention.

The audio system 1 includes a receiver 2 and a personal computer 14. The receiver 2 includes a tuner section, not shown. The personal computer 14 is connected via a USB interface 12 to the receiver 2 to control the receiver 2. If desired, the user can expand the audio system 1 by connecting a mini-disk (MD) player 15 to a first auxiliary terminal 23, which will be described later, and/or a tape deck 16 to a second auxiliary terminal 24, which will be described later.

An outline of the construction of the receiver 2 will be described by referring to FIG. 1.

A digital audio signal from a sound card of the personal computer 14 is inputted to a digital audio signal terminal 21. An analog audio signal from a sound card of the computer 14 is fed to an analog audio signal terminal 22. A digital or analog audio signal from an external digital audio (recording) reproducing device such as an MD player is delivered to the first auxiliary terminal 23. An analog audio signal from an external digital audio (recording) reproducing device such as the tape deck 16 is delivered to the second auxiliary terminal 24. The signal connecting terminals 21 to 24 are connected to an input selector 3. An audio signal via USB, i.e., PC-U is inputted via a USB interface 12, which will be described later, to the selector 3. The selector 3 includes a D/A converter and an A/D converter. An audio amplifier 4 conducts digital signal processing for the analog audio signal received via the selector 3, amplifies the audio signal, and outputs the amplified signal to a speaker terminal 5. The terminal 5 is connected to a speaker. A digital signal processor (DSP) 18 in the audio amplifier 4 executes the digital signal processing (DSP). An RAM 49 in the DSP 18 functions as a work area in the audio amplifier 4 to temporarily store various data items. An operator panel 6 includes various operation keys. A CPU 7 supervises the overall operation of the receiver 2. A display 8 displays various information items such as a sound source being selected and a DSP mode. An ROM 9 stores various programs for DSP, data for DSP, various control programs, and control data. An RAM 10 serves as a work area to temporarily store various data. The USB interface 12 communicates signals via a USB terminal 13 with the personal computer 14. Specifically, the USB interface 12 transfers a control signal received from the computer 14 to a bus 11 and a control signal received from the bus 11 to the computer 14. On receiving an audio signal (PC-U) from the computer 14, the USB interface 12 sends the signal to the input selector 3.

The bus 11 connects the input selector 3, the audio amplifier 4, the operator panel 6, the CPU 7, the display 8, the ROM 9, the RAM 10, and the USB interface 12 to each other.

The ROM 9 stores a program for the personal computer 14 to control the receiver 2.

DPS parameter values set by the user can be freely registered to an area in the RAM 10. The parameter values registered are saved for a period by a memory backup system including batteries.

The personal computer 14 controls the DSP mode change in the receiver 2. Moreover, the computer 14 changes each value of various types of parameters for each DSP mode, and each parameter values in the work area of the RAM 10.

The personal computer 14 displays image data corresponding to a value inputted for each DSP parameter. The user can visually recognize an acoustic effect corresponding to each DSP mode.

A program and graphic data to construct a GUI screen, which will be described later, are supplied to the personal computer 14 via a recording media such as a CD-ROM.

Referring next to display examples shown in FIGS. 4a to 4c", description will be given in detail of image data corresponding to a value inputted for each DSP parameter above.

Description will be given of a case in which the DSP parameter is "Initial Delay". The "Initial Delay" parameter indicates, when a sound is produced, an interval of time between a first peak of sound pressure observed at a sound receiving point and a second peak thereof. Setting a longer interval between the first and second peaks indicates that the sound producer is further from the sound receiving point. Setting a shorter interval between the first and second peaks means that the sound producer is nearer to the sound receiving point.

When a standard value is set to "Initial Delay" parameter, an image of the sound producer (e.g., a piano or the like) is displayed in a standard size as shown in FIG. 4a'. When a value larger than the standard value is set to the "Initial Delay" parameter, the image of the sound producer is displayed in a size smaller than the standard size as shown in FIG. 4a. When a value smaller than the standard value is set to the "Initial Delay" parameter, the image of the sound producer is displayed in a size greater than the standard size as shown in FIG. 4a".

The image of the sound producer changes in size by altering the "Initial Delay" parameter as above. The user consequently can visually recognize effect of the change of the parameter value.

Description will next be given of a case in which the DSP parameter is "Effect Trim". The "Effect Trim" parameter is a parameter to adjust an overall level of acoustic or sound effect. Setting the "Effect Trim" parameter to a smaller value lowers the overall level of acoustic effect. Setting the "Effect Trim" parameter to a greater value increases the overall level of acoustic effect.

When a standard value is set to "Effect Trim" parameter, a shade of an object (e.g., a wall or a ceiling of a room) around an image of the sound producer is displayed in standard degradation or thickness/thinness as shown in FIG. 4b'. When a value less than the standard value is set to the "Effect Trim" parameter, the color becomes thinner, namely, is displayed in lower gradation. When a value more than the standard value is set to the "Effect Trim" parameter, the color becomes thicker and is displayed in higher gradation.

As above, the shade of the object around the image of the sound producer changes in gradation by altering the "Effect Trim" parameter value. The user hence can visually perceive effect of the change of the "Effect Trim" parameter value.

Next, description will be given of a case in which the DSP parameter is "Room Size". The "Room Size" parameter is a parameter to set size of the listening room. Setting the "Room Size" parameter to a smaller value minimizes the space of the listening room. Setting the "Room Size" parameter to a greater value enlarges the room space.

When a standard value is set to the "Room Size" parameter, the space (for example, of a room) of the image is displayed in a standard size as shown in FIG. 4c'. When a value less than the standard value is set to the "Room Size" parameter, the space displayed is smaller than the standard space as shown in FIG. 4c". When a value more than the standard value is set to the "Room Size" parameter, the space displayed is larger than the standard space as shown in FIG. 4c.

As above, the space displayed as the image changes in size by altering the "Room Size" parameter value. Therefore, the user can visually recognize effect of the change of the "Room Size" parameter value.

Figure 2:
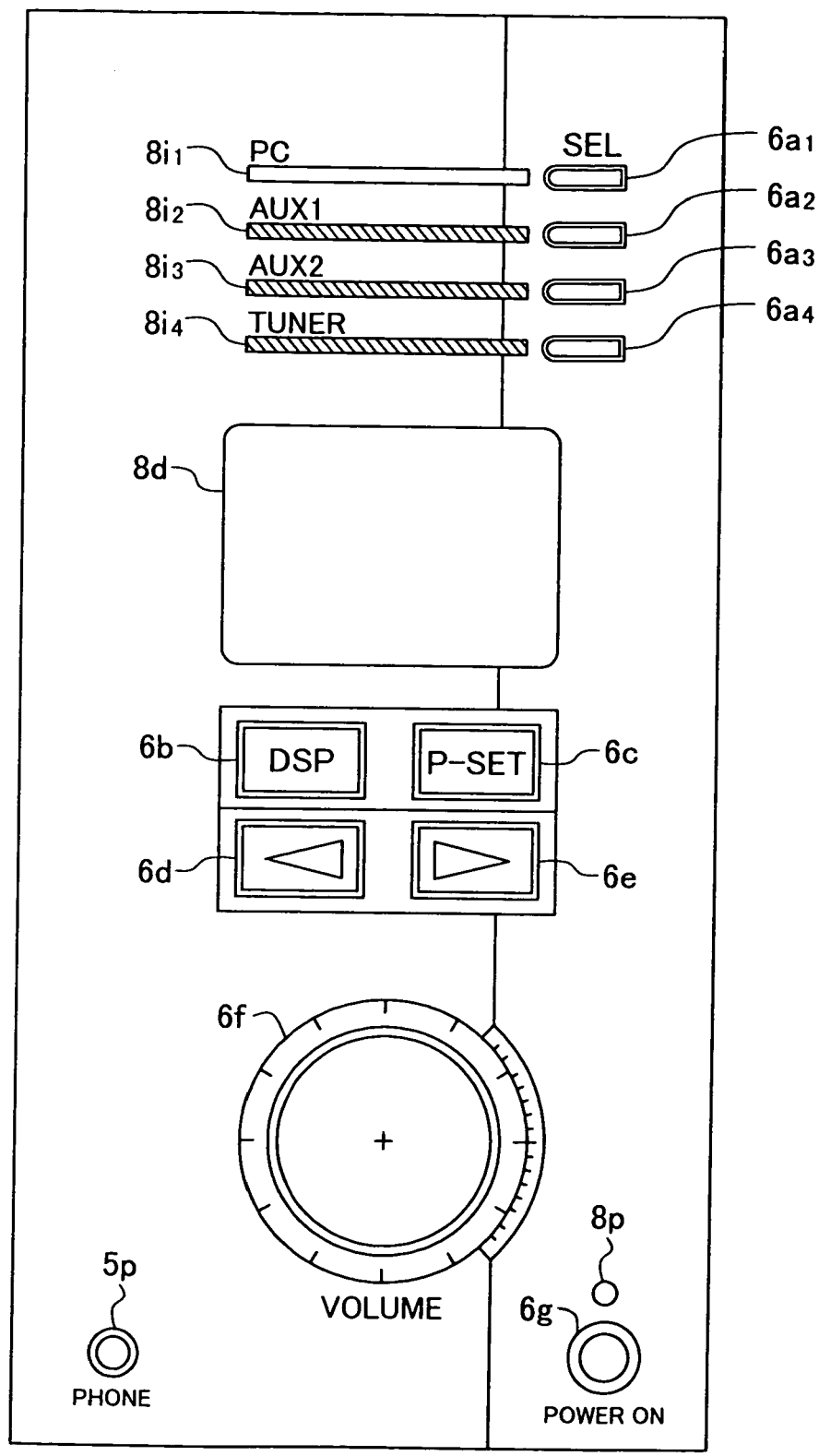
FIG. 2 is a front view of a front panel of the embodiment of the audio system.

FIG. 2 shows a front view of a front panel of the receiver 2.

The front panel of the receiver 2 includes a plurality of switches partly constituting the operation panel 6.

Selector switches 6a1 to 6a4 select a sound source. A DSP switch 6b indicates whether or not the DSP is operated. A preset switch 6c, which can be set to on exclusively with respect to the DSP switch 6b, indicates whether or not preset station selection is desired to function when the tuner section is in use. When the DSP switch 6b is on, a pair of up/down switches 6d and 6e function as a DSP mode selection switch. When the preset switch 6c is on, the switches 6d and 6e function as a station selection switch. A volume control 6f adjusts magnitude of sound volume. A power switch 6g turns power on/off.

The front panel of the receiver 2 includes a headphone jack 5p to connect a headphone.

The front panel of receiver 2 further includes display sections each constituting a part oh the display 8.

A multifunctional display section 8d, which includes a dot-matrix transmission liquid crystal display (LCD) with a backlight or a fluorescent luminescence (FL) display element, displays various information. When the sound source currently selected is a sound card of the personal computer 14 connected to the system via the digital audio terminal 21 or the analog audio terminal 22, a first indicator 8i1 turns on. When the current sound source is an external audio (recording) reproducing device connected to the system via the first auxiliary terminal 23, a second indicator 8i2 turns on. When the current sound source is an external audio (recording) reproducing device connected to the system via the second auxiliary terminal 24, a third indicator 8i3 turns on. When the current sound source is an internal tuner, a fourth indicator 8i4 turns on. When the receiver 2 is powered, a power indicator 8p turns on.

Figure 3:
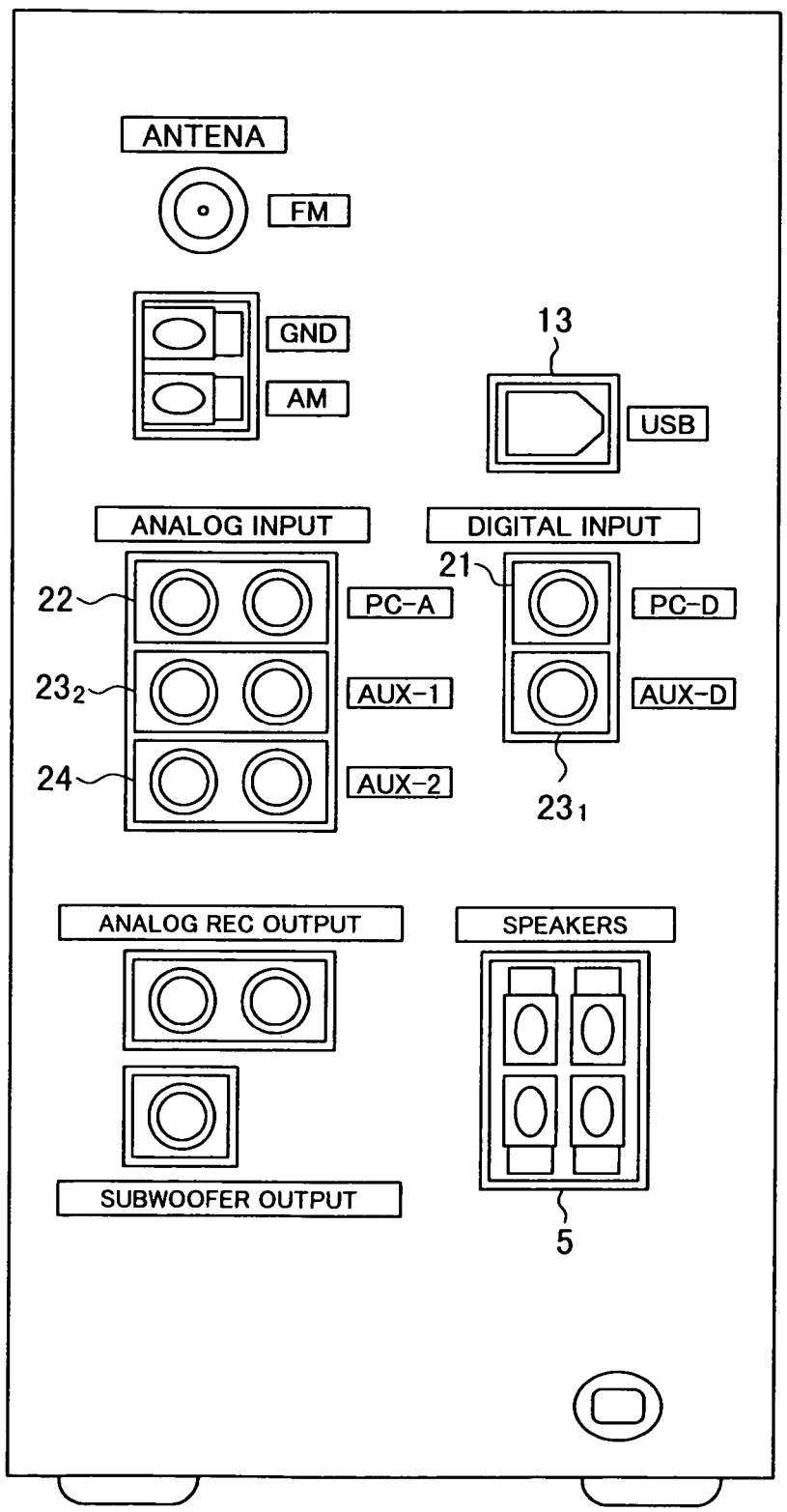
FIG. 3 is a front view showing a rear panel of the embodiment of the audio system.

FIG. 3 shows a front view of a rear panel of the receiver 2. Arranged on the rear panel are the speaker terminal 5, the digital audio terminal 21, the analog audio terminal 22, and the first and second auxiliary terminal 23 and 24 described above. The first auxiliary terminal 23 includes a digital audio auxiliary terminal $23_1$ to receive a digital audio signal from an external digital (recording) reproducing device and an analog audio auxiliary terminal $23_2$ to receive an analog audio signal from an external digital (recording) reproducing device. The rear panel further includes a USB terminal 13, antenna terminals (an FM antenna terminal, an AM antenna terminal, and a ground terminal), an analog audio output terminal, and a subwoofer output terminal.

Referring now to FIGS. 5 to 11, description will be given of a specific example of operation for the personal computer 14 to change DSP parameter values.

Figure 5:
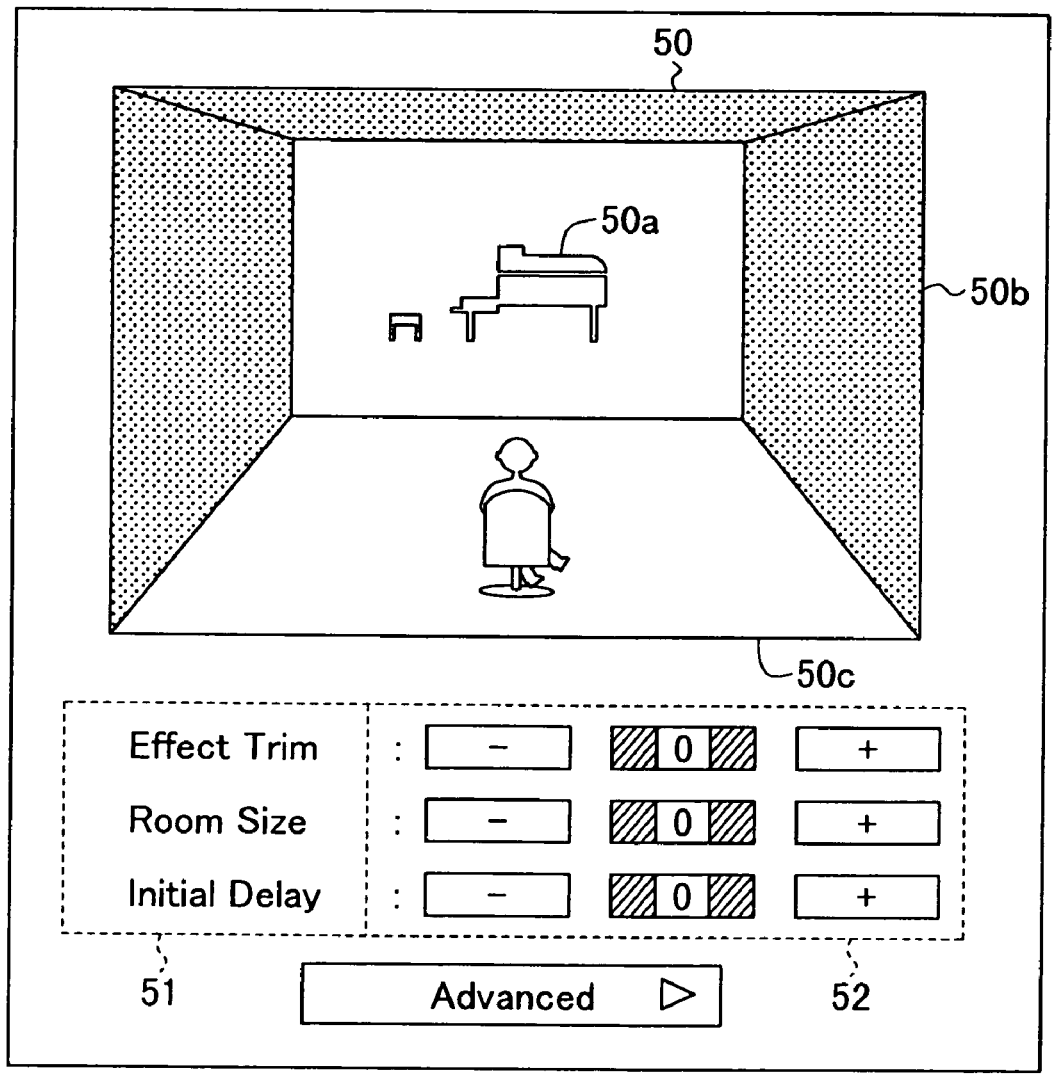
FIGS. 5 to 11 are diagrams showing examples of images displayed on a PC of the embodiment of the audio system corresponding to DSP parameter values.

FIG. 5 shows an example of a DSP setting screen image displayed when the DSP parameters are set to the standard values.

The DSP setting screen image includes a DSP parameter area 51 to display names of the DSP parameters, a parameter operator area 52 to set DSP parameter values in three stages, and an image picture 50 which changes according to the parameter setting values.

Figure 6:
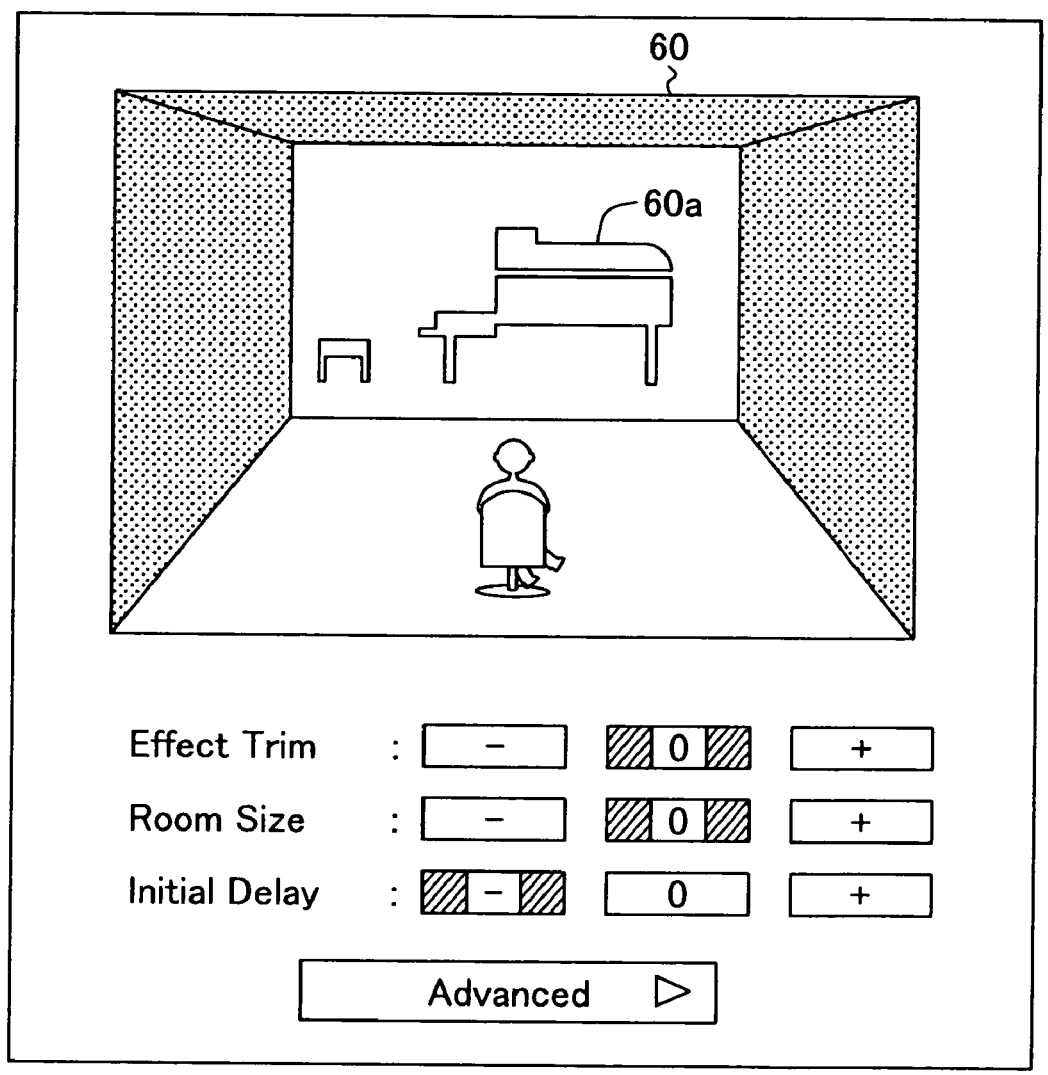

FIG. 6 shows a DSP setting screen displayed when the "Initial Display" parameter is set to a value less than the standard value.

The image picture 60 in FIG. 6 differs in size of the sound producer, i.e., a piano, from the image picture 50 displayed with the standard parameter value (FIG. 5).

Specifically, the piano 60a in the image picture 60 is larger than the piano 50a in the image picture 50.

Consequently, the user can visually recognize that effect obtained when the value set to the "Initial Delay" parameter is less than the standard value is substantially the same as effect attained when the distance between the listener and the piano as the sound source is reduced.

Figure 7:
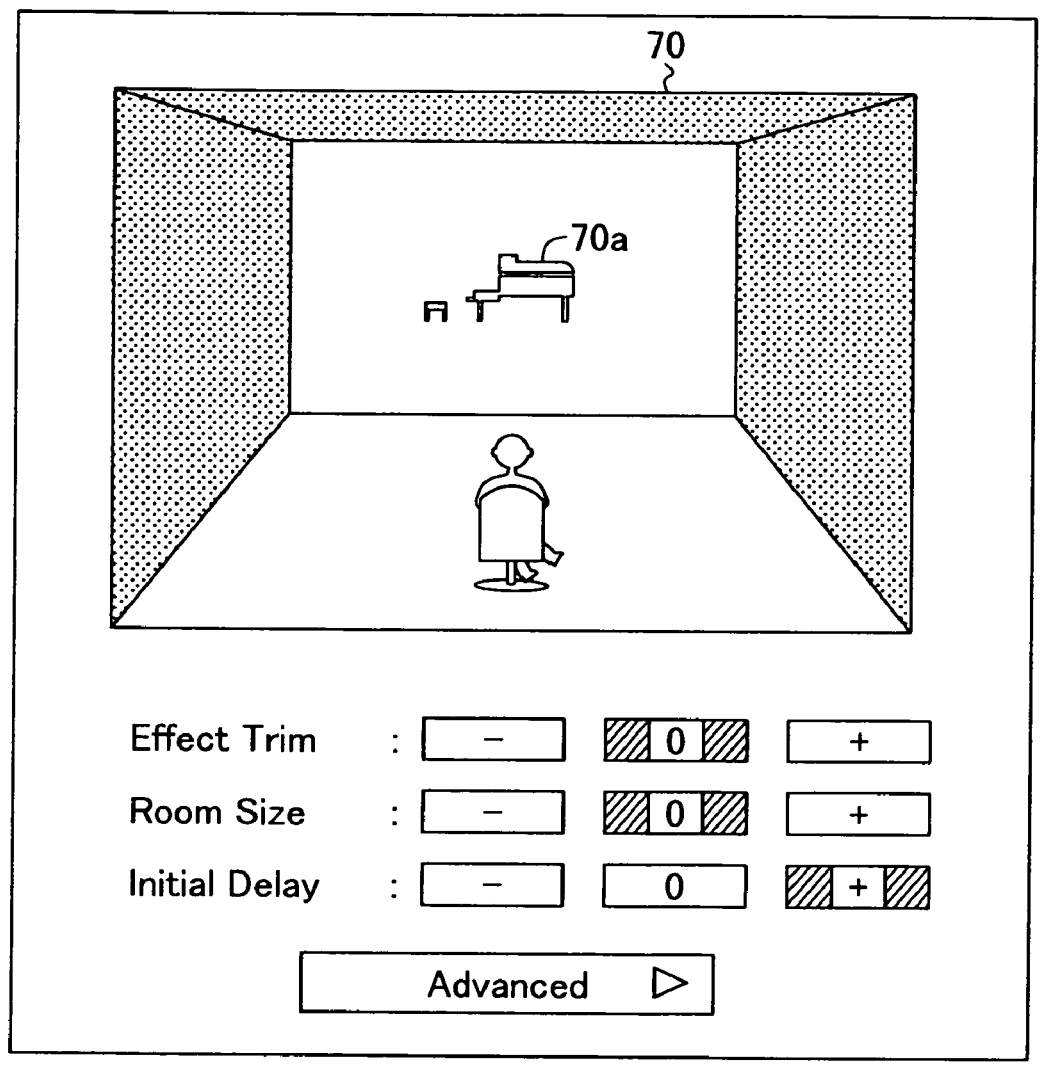

FIG. 7 shows a DSP setting screen image displayed when the "Initial Display" parameter is set to a value more than the standard value. In FIG. 7, the piano 70a in the image picture 70 is smaller in size than the piano 50a in the image picture 50.

Therefore, the user can visually recognize effect of the parameter. When the value set to the "Initial Delay" parameter is more than the standard value, the effect obtained is almost the same as effect attained when the distance between the listener and the piano is increased.

Figure 8:
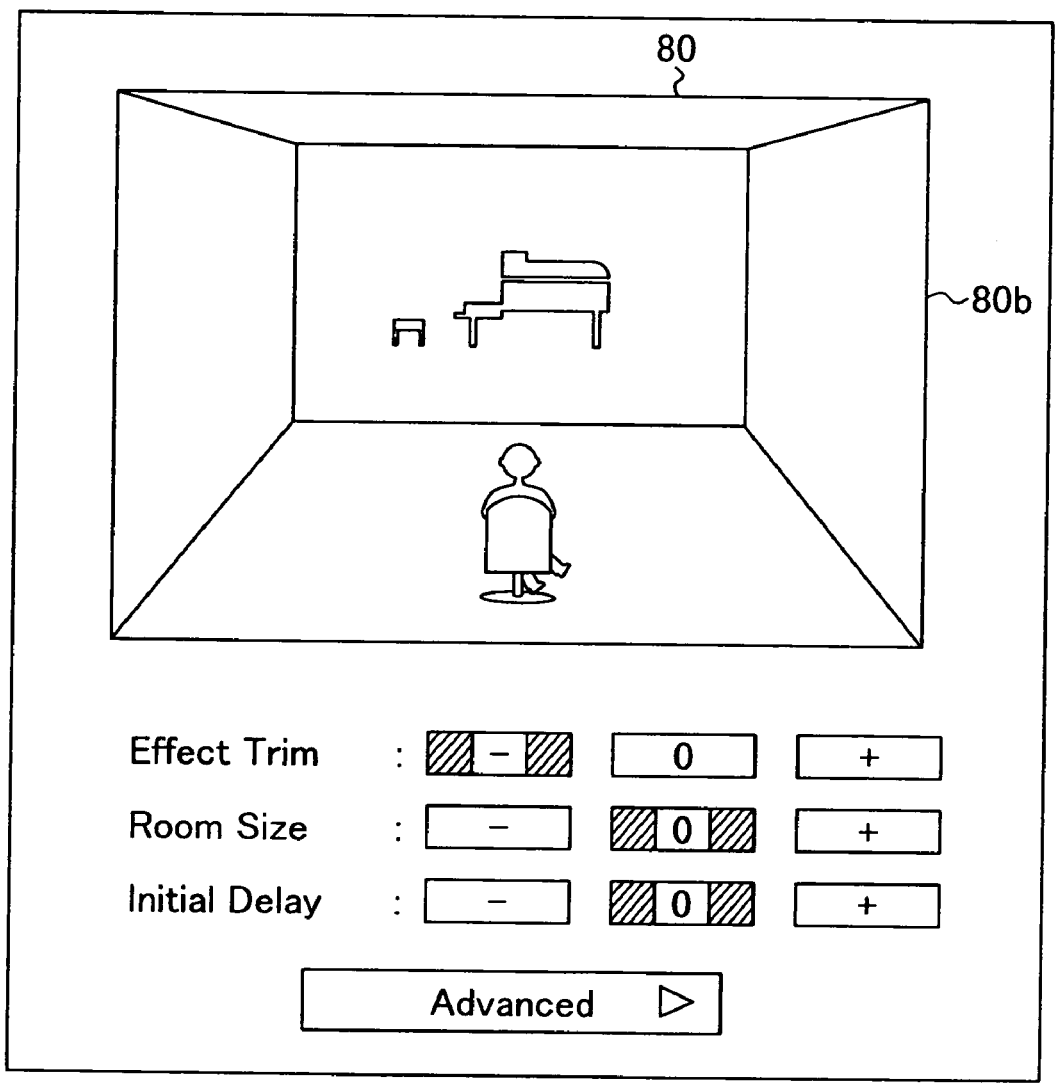

FIG. 8 shows a DSP setting screen image displayed when the "Effect Trim" parameter is set to a value less than the standard value.

The image picture 80 in FIG. 8 and the image picture 50 displayed with the standard parameter value (FIG. 5) differ from each other in gradation or thickness/thinness of the shade of walls of the room.

Concretely, the shade of walls 80b in the image picture 80 is thinner than that of walls 50a in the image picture 50.

In consequence, the user can visually recognize that when the value set to the "Effect Trim" parameter is less than the standard value, a total level of acoustic or sound effect is decreased.

Figure 9:
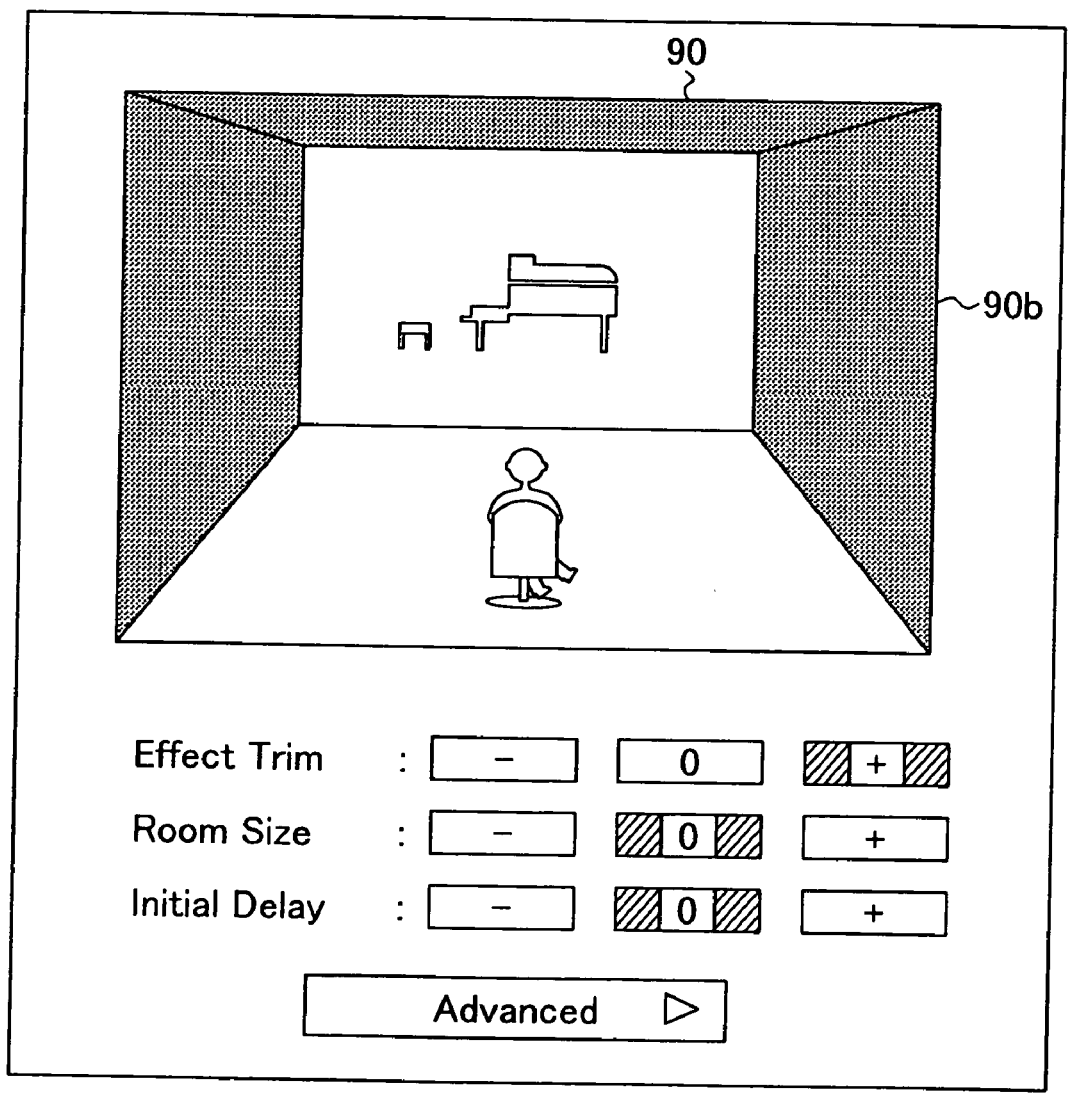

FIG. 9 shows a DSP setting screen image displayed when the "Effect Trim" parameter is set to a value more than the standard value. In FIG. 9, the shade of walls 90b of the room in the image picture 90 is thicker than that of the walls 50a in the image picture 50.

Therefore, the user can visually recognize that when the value set to the "Effect Trim" parameter is more than the standard value, the total level of acoustic or sound effect is increased.

Figure 10:
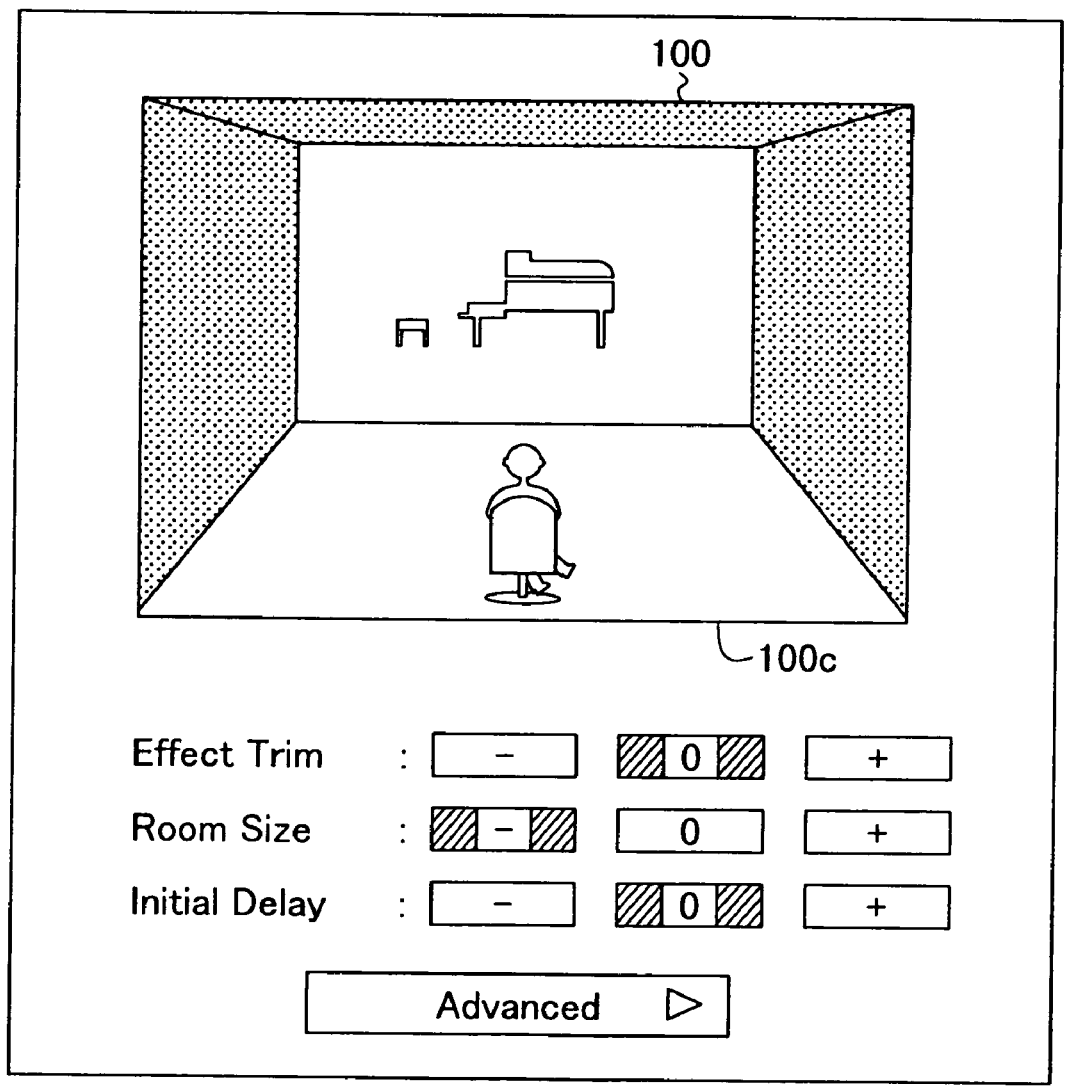

FIG. 10 shows a DSP setting screen image displayed when the "Room Size" parameter is set to a value less than the standard value.

The image picture 100 in FIG. 10 differs in size of space of the room from the image picture 50 displayed with the standard parameter value (FIG. 5).

Specifically, the space 100c of the room in the image picture 100 is smaller than the space 50c of the room in the image picture 50.

Consequently, the user can visually recognize effect obtained when the value set to the "Room Size" parameter is less than the standard value. Namely, the effect attained is substantially the same as effect obtained when the space of the room of the listener becomes smaller.

Figure 11:
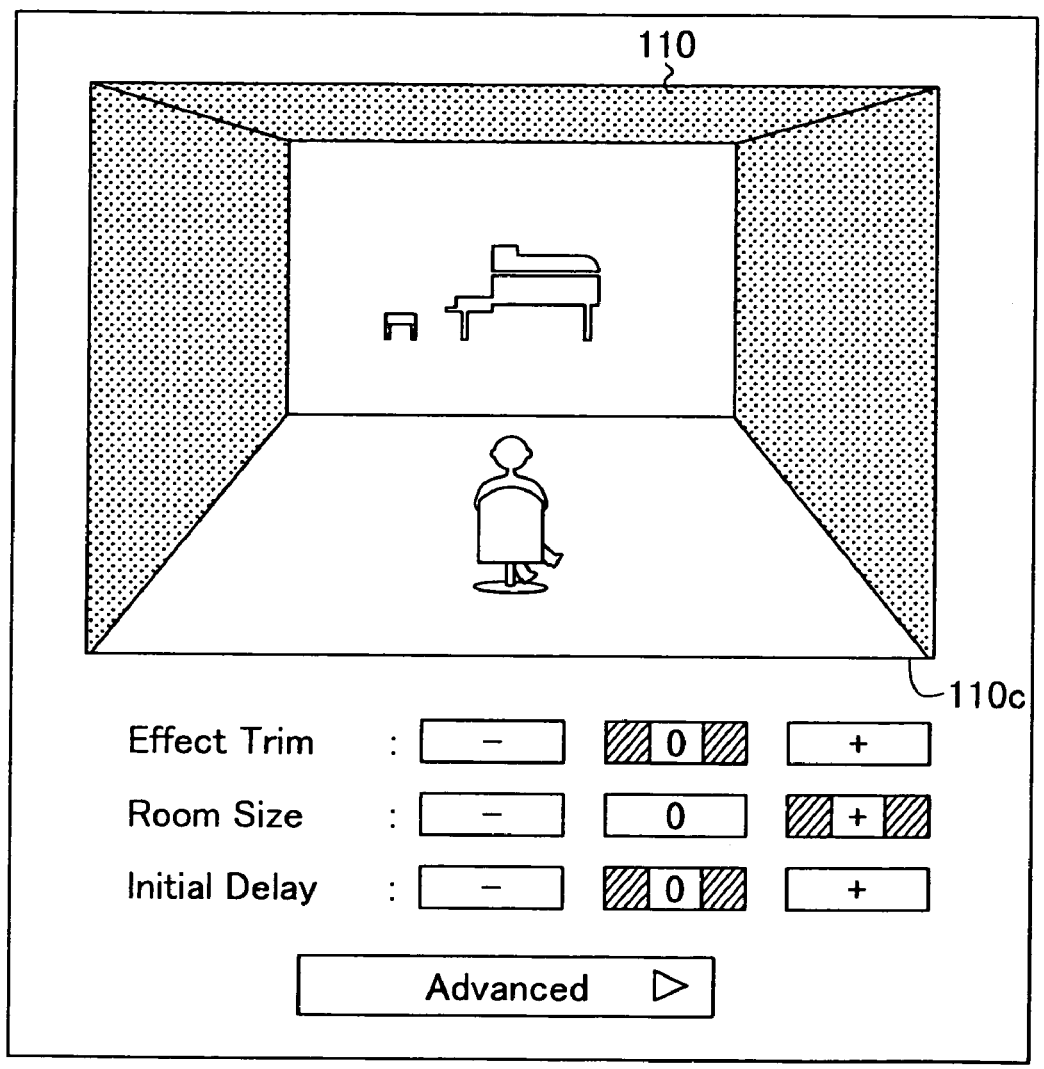

FIG. 11 shows a DSP setting screen image displayed when the "Room Size" parameter is set to a value more than the standard value. In FIG. 11, the space 100c of the room in the image picture 110 is larger than the space 50c of the room in the image picture 50.

Resultantly, the user can visually recognize that effect obtained when the value set to the "Room Size" parameter is more than the standard value is almost the same as effect attained when the space of the room of the listener becomes greater.

Figure 12:
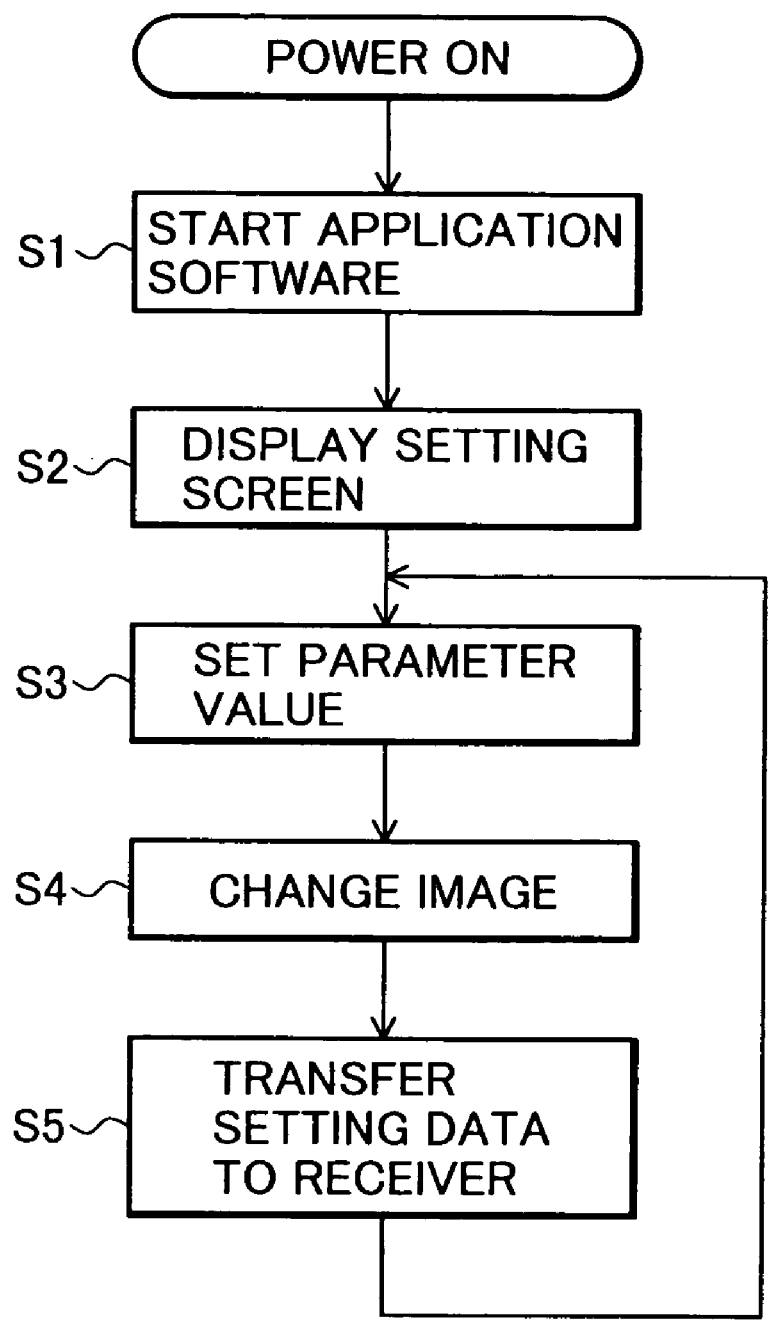
FIG. 12 is a flowchart showing an example of general operation of the embodiment of the audio system.
Figure 13:
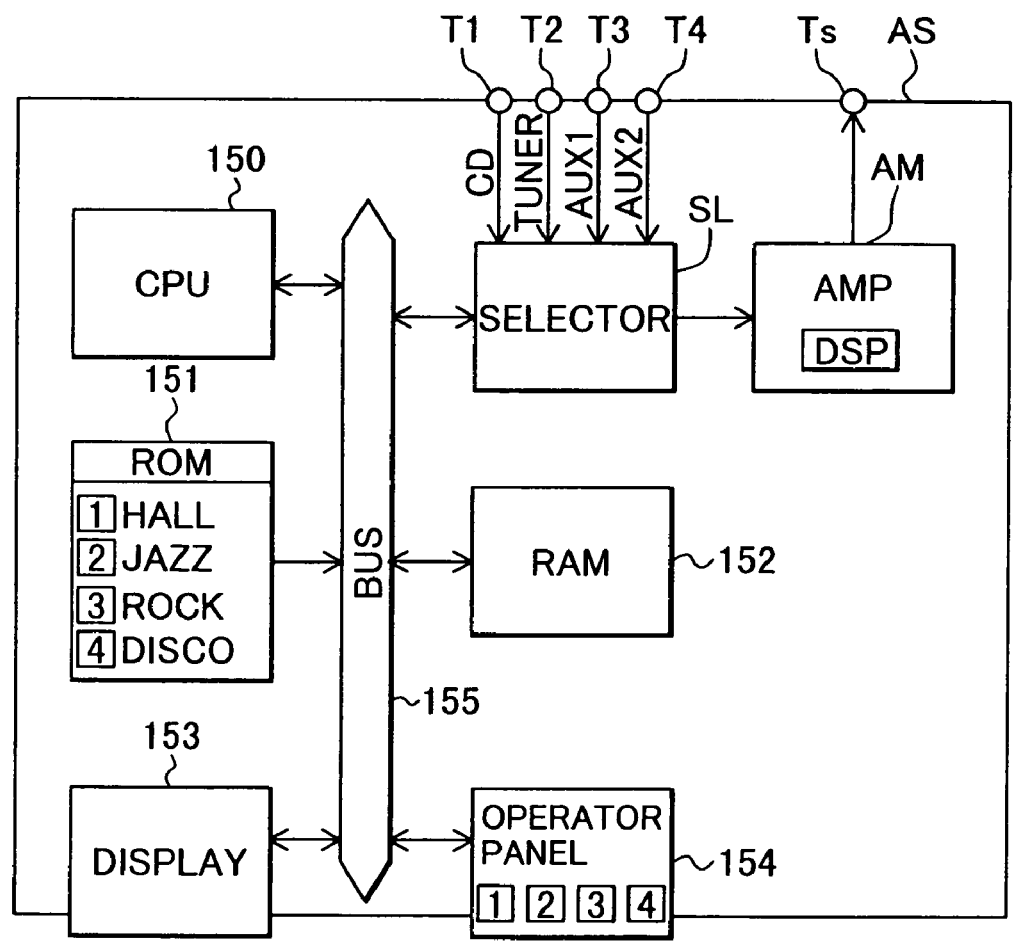
FIG. 13 is a block diagram showing structure of an audio system of the prior art.

Referring next to FIG. 12, description will be given of an example of general operation of the personal computer 14 to set DSP parameters. In this description, the DSP setting screens shown in FIGS. 5 and 6 will be referenced when necessary.

First, the personal computer 14 is powered to start its operation, and then the computer 14 starts application software to set DSP parameters (step S1).

The software displays, for example the DSP setting screen image on a display of the computer 14 (step S2).

The user selects in the screen a value of a DSP parameter to be changed (step S3).

In response to the selection of the parameter value, the software changes the image picture displayed on the DSP setting screen (step S4).

Specifically, when the user selects, for example, "−" to set a value less than the standard value, from the parameter operators corresponding to the "Initial Delay" parameter shown in FIG. 5, the software changes the image picture 50 into the image picture 60 of FIG. 6.

The user can therefore visually recognize that effect obtained when the value set to the "Initial Delay" parameter is less than the standard value is almost the same as effect attained when the listener is nearer to the piano as the sound source.

When parameter values are changed as above, the value of each parameter after the change is transferred via the USB terminal 13 to the receiver 2 of the audio system 1 (step S5).

The receiver 2 stores the values of parameters after the change in a work area of the RAM 10. The acoustic processing is thereafter executed according to the values of DSP parameters changed.

In the embodiment above, when the user selects a desired setting value from the parameter operators of the DSP parameters displayed on the DSP setting screen, an image associated with each parameter type is changed according to the setting value selected. Therefore, the user can visually perceive an acoustic characteristic influenced by the change of the parameter value. This means that even a user not familiar with technical knowledge of DSP parameters can easily enjoy the acoustic effect.

The DSP setting screen of the embodiment displays three types of parameters, i.e., "Effect Trim", "Room Size", and "Initial Display". However, the parameters to be changed in the DSP setting screen are not limited to the three types of parameters. Namely, other DSP parameters can also be treated in a similar fashion.

In the DSP setting screen of the embodiment, three stages are prepared for the setting values of each parameter. However, the number of setting stages is not limited to three. That is, more than three stages may be employed, and the values may be continuously set, for example, by a slide bar.

When the value of "Effect Trim" parameter is changed in the DSP setting screen of the embodiment, the gradation or thickness/thinness of the shade of walls and/or the ceiling of the room is changed in the image picture so that the viewer images effect of the change in the value "Effect Trim" parameter. In place of gradation of the shade, patterns painted on walls and/or the ceiling of the room may be changed in the image picture for the viewer to image effect of the change in the value "Effect Trim" parameter.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The invention claimed is:

1. An audio system comprising setting means, display means, transfer means, a controller, and acoustic effect adding means, wherein:

a type is selected among types of a parameter specifying acoustic effect through the setting means and a value of the parameter is set through the setting means;

one of types of the parameter indicates an interval of time between a first peak of sound pressure observed at a sound receiving point and a second peak thereof;

the type of the parameter selected and the value of the parameter set through the setting means are transferred to the acoustic effect adding means through the transfer means;

the acoustic effect adding means adds acoustic effect to an inputted signal depending upon the type and the value of the parameter transferred through the transfer means; and the controller displays an image picture showing a sound source on the display means, and changes a size of the image picture depending upon the value of the parameter set through the setting means when the type of the parameter indicating an interval of time between a first peak of sound pressure observed at a sound receiving point and a second peak thereof is selected through the setting means.

2. An audio system according to claim 1, wherein:

one of types of the parameter determines an acoustic characteristic obtained by a size of a listening room; and the controller displays an image picture showing the listening room on the display means, and changes a size of the image picture showing the listening room depending upon the value of the parameter set through the setting means when the type of the parameter determining an acoustic characteristic obtained by the size of the listening room is selected through the setting means.

3. An audio system according to claim 1, wherein:

one of types of the parameter is a type for adjusting an overall level of acoustic or sound effect; and the controller changes a shade of the image picture displayed on the display means depending upon the value of the parameter set through the setting means when the type of the parameter for adjusting an overall level of acoustic or sound effect is selected through the setting means.

4. An audio system control method comprising steps of:

(a) selecting a type among types of a parameter specifying acoustic effect and setting a value of the parameter according to an operation performed by a user;

(b) displaying an image picture showing a sound source on a display means, and changing a size of the image picture depending upon the value of the parameter set in the step (a) when the type of the parameter indicating an interval of time between a first peak of sound pressure observed at a sound receiving point and a second peak thereof is selected in the step (a); and (c) transferring the type selected and the value set in the step (a) to an acoustic effect adding means which adds acoustic effect to an inputted signal depending upon the type and the valued of the parameter transferred.

5. An audio system control method according to claim 4, further comprising the step of displaying an image picture showing a listening room on the display means, and changing a size of the image picture showing the listening room depending upon the value of the parameter set in the step (a) when the type of the parameter determining an acoustic characteristic obtained by the size of the listening room is selected in the step (a).

6. An audio system control method according to claim 4, further comprising the step of changing a shade of the image picture displayed on the display means depending upon the value of the parameter set in the step (a) when the type of the parameter for adjusting an overall level of acoustic or sound effect is selected in the step (a).

7. A recording media for recording a program for a computer executing steps of:

(a) selecting a type among types of a parameter specifying acoustic effect and setting a value of the parameter;

(b) transferring the type selecting and the value set in the step (a) to an acoustic effect adding means which adds acoustic effect to an inputted signal depending upon the type and the value of the parameter transferred; and (c) displaying an image picture showing a sound source on a display means, and changing a size of the image picture depending upon the value of the parameter set in the step (a) when the type of the parameter indicating an interval of time between a first peak of sound pressure observed at a sound receiving point and a second peak thereof is selected in the step (a).

8. A recording media according to claim 7, wherein the program further executes the step of displaying an image picture showing a listening room on the display means, and changing a size of the image picture showing the listening room depending upon the value of the parameter set in the step (a) when the type of the parameter determining an acoustic characteristic obtained by the size of the listening room is selected in the step (a).

9. A recording media according to claim 7, wherein the program further executes the step of changing a shade of the image picture displayed on the display means depending upon the value of the parameter set in the step (a) when the type of the parameter for adjusting an overall level of acoustic or sound effect is selected in the step (a).

* * * * *